United States Patent [19]

Weygant

[11] 4,262,767
[45] Apr. 21, 1981

[54] SNOW SCOOTER

[76] Inventor: Nelson Weygant, 1921 24th Ave. No., St. Petersburg, Fla. 33713

[21] Appl. No.: 939,439

[22] Filed: Sep. 5, 1978

[51] Int. Cl.³ .............................................. B62M 27/02
[52] U.S. Cl. ..................................... 180/192; 180/205
[58] Field of Search ...................... 180/5 R, 5 A, 6, 7, 180/33 C, 33 D, 34, 190, 192, 205

[56] References Cited

U.S. PATENT DOCUMENTS

| | | | |
|---|---|---|---|
| 1,068,883 | 7/1913 | Frank | 180/5 R |
| 1,530,223 | 3/1925 | Young | 180/5 R |
| 2,289,768 | 7/1942 | Fehrenbacher | 180/5 R |
| 3,757,880 | 9/1973 | Jones | 180/5 R |
| 3,800,898 | 4/1974 | Griffin | 180/34 X |
| 4,068,732 | 1/1978 | Granryd | 180/6.7 |

Primary Examiner—John A. Pekar
Attorney, Agent, or Firm—Arthur W. Fisher, III

[57] ABSTRACT

A vehicle assembly of the type primarily designed to travel over snow or ice covered terrain and including a first and second drive assembly interconnected in driving relation to the running gear of the vehicle wherein either drive assembly can be activated to power and thereby motivate the vehicle alternately both drive assemblies can be activated to operate concurrently causing movement of the vehicle over the intended surface. The vehicle assembly further includes a base and a removably attached slide means which respectively have connected thereto, in removable fashion, the stearing means and the operative support means wherein the basic components of the vehicle can be readily disassembled for efficient and effective storage and transportation of the vehicle such as in the trunk of an automobile or the like.

5 Claims, 5 Drawing Figures

SNOW SCOOTER

BACKGROUND OF THE INVENTION

1. Field of the Invention

This invention relates to a vehicle primarily designed to travel over ice or snow covered terrain and which is capable of having its components readily disassembled from one another thus to be stored and transported in an effective manner while the vehicle is powered and/or driven from at least a plurality of drive assemblies which may operate independently or concurrently to drive the vehicle over the chosen or preferred terrain.

2. Description of the Prior Art

Vehicles commonly known as "snow mobiles" and specifically designed to travel over snow or ice covered terrain have been in existence and commercially available to the general public for many years. Traditionally, said vehicles are powered by a gasoline internal combustion engine and are further designed to accomplish relatively high speeds. Such vehicles are utilized both for recreation and to accomplish travel in cold environments where snow or ice cover a major portion of the terrain for numerous months out of the year. While such vehicles have been designed to achieve a practical application in modern day society, numerous of such vehicles include inherent disadvantages.

Such commonly recognized disadvantages comprise the occurence of an extremely high and objectionable noise level produced by the operation of the typical I.C. engine utilized in such vehicles. Also, the general high speed of operation of such vehicles frequently damages the terrain over which the vehicle travels. Such damages include the permanent distruction of plants, trees and like foliage as well as the creation of ruts, ditches and like which disturbs the natural drainage and permanently alters the natural contour of the land on which the snow or ice has fallen. Accordingly, it is readily apparent that the operation of such commercially available "snow mobiles" is permanently damaging to the natural environment and terrain during the operation of such vehicles in their intended fashion.

Since such prior art vehicles are more "performance" oriented in their design to accomplish high speed operation, result in structure is normally extremely heavy and incapable of being transported by conventional vehicles such as in the trunk of an automobile or the like. Similarily the structural design of such snow mobile vehicles make it impossible for one or sometimes even two operators to physically lift and/or remove and/or place the vehicle in a desired location such as moving to and from conventional vehicles. It is therefore readily apparent that such modern day, commercially available snow mobiles are not readily adaptable to emergency situations or operation, storage or transportation by single individual or operator. In addition the general cost range of such commercially available and prior art snow mobile vehicles is relatively high due to the sophisticated construction and streamlined design incorporated in such vehicles to accomplish the intended high performance characteristics.

It is therefore readily seen that there is a need for this particular industry for a snow mobile type vehicle capable of being operated at least in a relative emergency situation which is light in weight, much less in cost of acquisition and maintenance and capable of being assembled, stored, transported and operated by single individual utilizing conventional storage facilities of an automobile, truck, van, etc. Therefore in order to accomplish the desired function of an "emergency" snow scooter type vehicle and thereby overcome certain inherent disadvantages present in commercially available snow mobiles, certain major components of the desired and intended snow scooter structure should be readily disconnected from one another so as to accomplish storage of the vehicle in a relatively small space. The ready disconnection of components would further accomplish easy assembly and disassembly by a single operator and also result in the removal and/or storage from a given compartment or area, by one person.

Preferably, such an intended snow scooter structure should be quiet in operation and in order to maintain low cost of maintenance and acquisition could include a second drive assembly such as a pedal and sprocket combination which allows the movement or travel of the vehicle due to the exertion of manual power on the pedal and sprocket drive assembly. An additional drive assembly such as an electric motor operated from a conventional DC power source such as an automobile battery of the like can serve as an additional power supply. This would be capable of driving the vehicle over sufficiently long distances to render aide to the user or operator in what could be considered emergency situations such as blizzards, snow drifts, automobile break downs, etc.

SUMMARY OF THE INVENTION

This invention relates to a vehicle designed to travel over ice or snow covered terrain and capable of being used in what could be considered emergency situations. Furthermore the design and structural configuration of the subject vehicle assembly enables a single operator to remove the subject vehicle from a storage area, assemble such vehicle and replace the vehicle in the intended storage area once its use has been accomplished.

More specifically the vehicle structure of the present invention may generally be considered a snow scooter type vehicle that includes a base means having, in part, a single sheet defined by a substantially planar configuration so as to provide a predetermined surface area disposed to travel, in sliding fashion, over the terrain on which the vehicle travels.

Running gear is movably mounted on the base means and includes a pair of track assemblies positioned in surface engaging relation to the surface over which the vehicle travels. More specifically each track assembly is positioned along the lateral, preferably longitudinal edge of the base means and is mounted to drive the base means through gripping engagement with the surface over which the vehicle travels. The axle means including two axle elements disposed in spaced apart relation to one another are disposed to drivingly engage the track assemblies. Each axle element is disposed in driving interconnection with correspondingly positioned ends of each track assembly.

Dependent upon the particular embodiment of the present invention one or both of the axle elements may be considered drive axles in that they are rotatably connected in driven relation to the drive means of the present invention.

Accordingly drive means includes at least a first drive assembly and a second drive assembly.

In the preferred embodiment the first drive assembly includes an electric motor powered by a conventional DC power source such as an automobile battery.

Similarily, the second drive assembly is manually powered and may be defined by a pedal and sprocket assembly. In the embodiment of the present invention, the first and second drive assemblies are drivingly interconnected to separate ones of the two axle elements. This embodiment thereby defines two separate drive axles. Activation of either drive assembly causes driving rotation of the associated drive axle and propulsion of the vehicle. In addition activation concurrently of both of the drive assemblies causes driving rotation of both of the drive axles and similar propulsion of the vehicle. In cases of steep incline or unusually rough terrain both drive axles may be activated to provide the vehicle of the subject invention with sufficient propulsion force to move the vehicle over the intended terrain.

A steering means in the form of a handle bar assembly may be mounted directly on the base means but a sufficient distance away from the operator of the vehicle so as to cause its manipulation by exerting force thereon. More specifically a rearward and/or concurrent rotational force exerted on the stearing mechanism of the present invention will cause a tilting of the base means along its rear edge and adjacent or collinear to the rear axle element. This pivoting will cause angular inclination of the base means and/or rising of the leading edge of the base means. The concurrent rotational force exerted on the stearing mechanism will cause its pivotal movement thereby allowing the directing of the base means in a direction either right or left of the operator.

The vehicle of the present invention further comprises a slide means also primarily defined by a sheet of substantially ridged material having a plane or configuration and further having the operator's support means disposed thereon. The operator's support means is generally disposed in the configuration of a seat or like support element capable of allowing the operator to rest substantially his entire weight on the operator's support means and therefore on the slide means itself. The configuration and dimension of the sheet is such as to provide proper surface area to distribute as effectively as possible the weight of the operator over the surface over which the vehicle travels. For purposes of more efficient weight distribution the electrical power source such as a conventional DC battery may also be mounted on the slide means in attached relation to the electric motor defining the first drive assembly by conventional electric concurrent conductors.

An important feature of the present invention is the removable interconnection of the operator's support means to the slide means, the steering means to the base means, and the slide means to the base means. Disconnection of the aforementioned components in this manner readily allows the disassembly of the vehicle into its various and separate components and the more effective and efficient storage and placement of the vehicle into and out of a storage compartment such as the trunk of a conventional vehicle or the like.

Accordingly in operation, such as an emergency situation during a blizzard or break down of an automobile, the operator merely removes the various disassembled components from the trunk of his automobile, places the various components in interconnected fashion to one another on the surface over which the vehicle is intended to travel and connect the DC power source to the electric motor defining the first drive assembly. It should be readily made apparent that the automobile battery used to power the electrical system of the automobile may be removed from the automobile itself and used as the DC power source to drive the electric motor of the first drive assembly. Alternately other type of batteries or conventional power sources can be utilized. Once assembled activation of a control switch will cause rotation of one drive axle through powering of the electric motor and rotation of the correspondingly positioned drive axle. Alternately the first drive assembly can be left unactivated and the entire vehicle can be powered manually by the operator activating the pedal and sprocket assembly which may be attached to second axle element thereby defining it as a drive axle. As set forth above both first and second drive assemblies can be operated concurrently in order to traverse rather steep or rough terrain where use of only one of the drive assemblies is ineffective or inefficient for proper travel of the vehicle.

The invention accordingly, comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
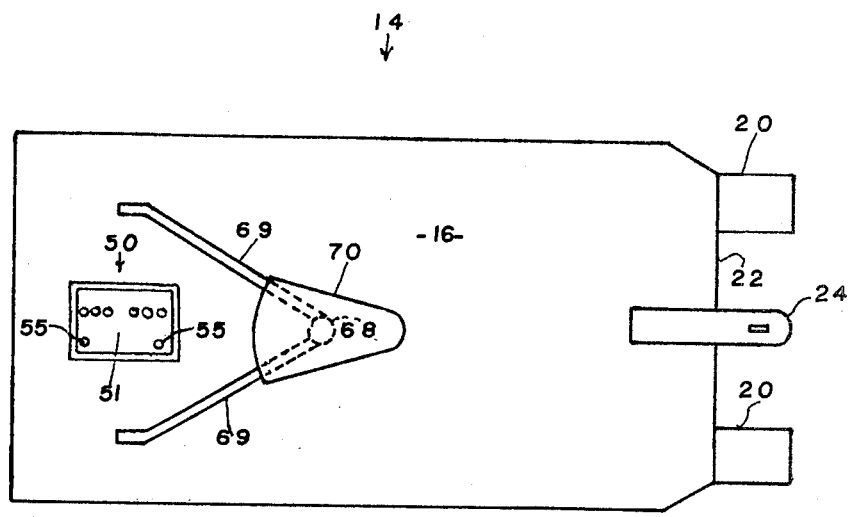
FIG. 1 is a top plan view of the slide means of the vehicle of the present invention.

As shown in FIGS. 1, 2, 3 and 4, the vehicle of the present invention comprises a base means (FIGS. 3, 4) generally indicated as 10 and defined by the sheet-like structure 12 made from a substantially ridged material and having a substantially planar configuration. The purpose of the planar configuration would be to create sufficient surface area to distribute the weight of the vehicle effectively over the surface of the snow, ice or ground on which the vehicle travels.

A slide means generally indicated as 14 is also at least partially defined by a sheet-like structure 16 having a planar configuration so as to slidingly engage the surface over which the vehicle travels and thereby effectively distribute the weight of the vehicle and the operator riding on the vehicle over such surface area. Both the base means 10 and the slide means 14 may include inclined ski head elements 18 and 20 connected to or inwardly formed on the leading edge 21 and 22 respectively of the base means and the slide means. These ski head structures serve to allow movement of both the base means and the slide means over the various contours of the terrain over which the vehicle travels. Interconnection between the base means (FIG. 3) and the slide means (FIG. 1) occurs through a conventional ball 23 and socket 24 structure attached respectively to the base means and the slide means. Other type of interconnection may of course be utilized as long as the interconnection between the base sheet twelve and the slide sheet 16 is readily disconnectable and further allows pivotal motion relative to the common longitudinal axis of both the base sheet 12 and slide sheet 16 when they are in aligned relation with one another.

Figure 3:
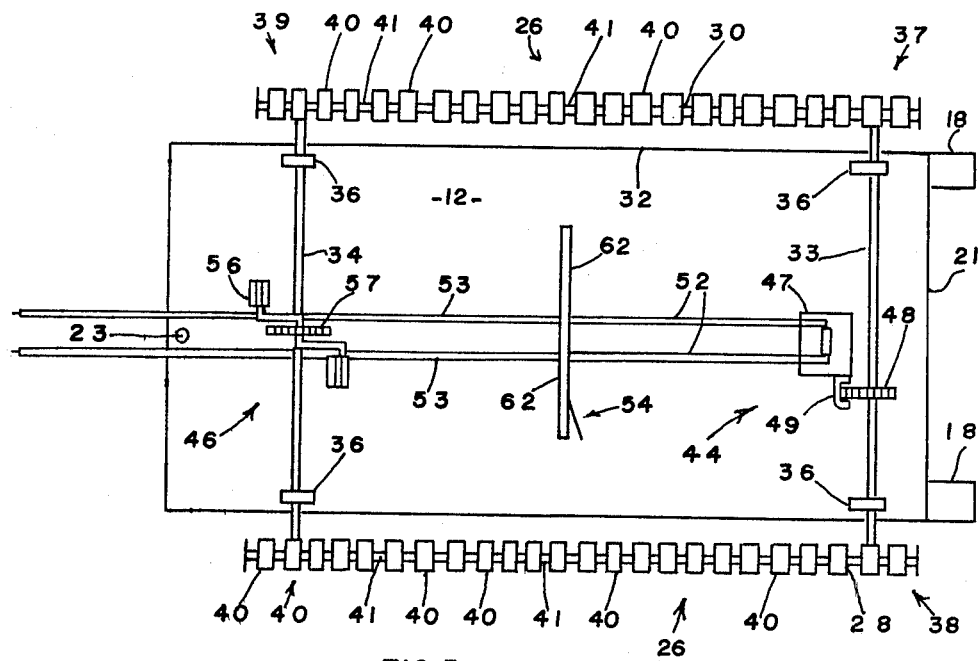
FIG. 3 is a top plan view of the base means including running gear and drive assemblies interconnected thereto.
Figure 4:
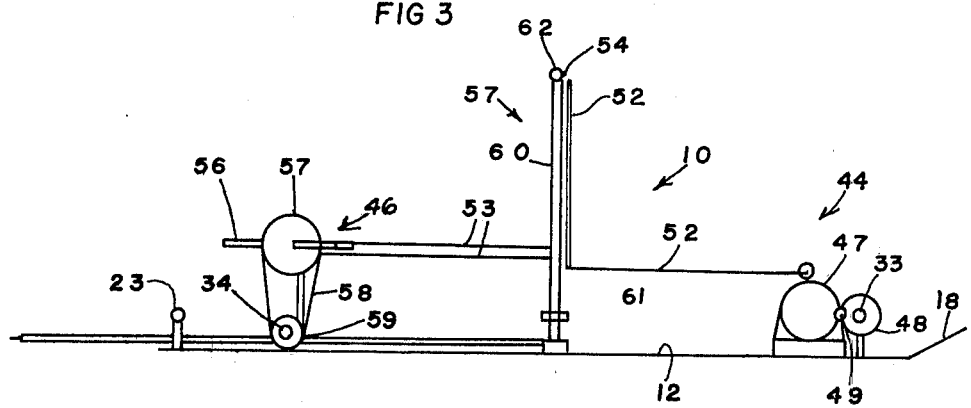
FIG. 4 is a side view of the embodiment of FIG. 3.

With reference to FIGS. 3 and 4 the subject vehicle includes running gear generally indicated as 26 and includes two track assemblies 28 and 30 mounted on opposite sides and substantially adjacent to opposite lateral edges 31 and 32 of the base means. Running gear further includes axle means including two axle elements 33 and 34 rotatably mounted on the base means by pushing connectors 36. Opposite ends of axle element 33 are connected to the front end of both the track assemblies 28 and 30 as at 37 and 38. Similarily opposite ends of axle element 34 are rotatably interconnected to correspondingly positioned ends of the track assemblies 28 and 30 as at 39 and 40. Accordingly at least one of the axle elements 33 and 34 may define the drive axle by being itself drivingly rotated by a drive means as will be explained in greater detail hereinafter. The track assemblies 28 and 30 may comprise a substantially closed loop or continuous configuration including a plurality of grasping elements 40 in the form of ridged material lengths disposed in spaced apart relation from one another and mounted on a continuous belt 41. Alternately another embodiment of the present invention may comprise the entire track assembly 26 formed from a hard rubber or like material including the various lengths 40 being formed in a specific configuration so as to effectively grasp the surface over which the vehicle travels.

Figure 5:
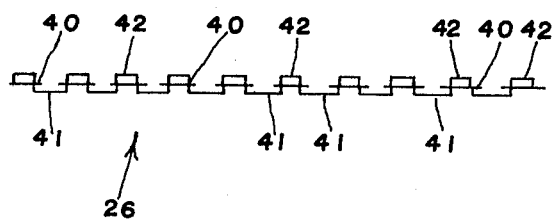
FIG. 5 is a detailed view in partial cut away showing another embodiment of the running gear.

FIG. 5 shows yet another embodiment of the present invention wherein each of the track assemblies designated as 26' comprise the plurality of grasping lengths 40 having mounted thereon grasping fingers 42 extending outwardly from the outer surface of the individual lengths 40 mounted on a centrally located and continuously configured belt 41.

Figure 2:
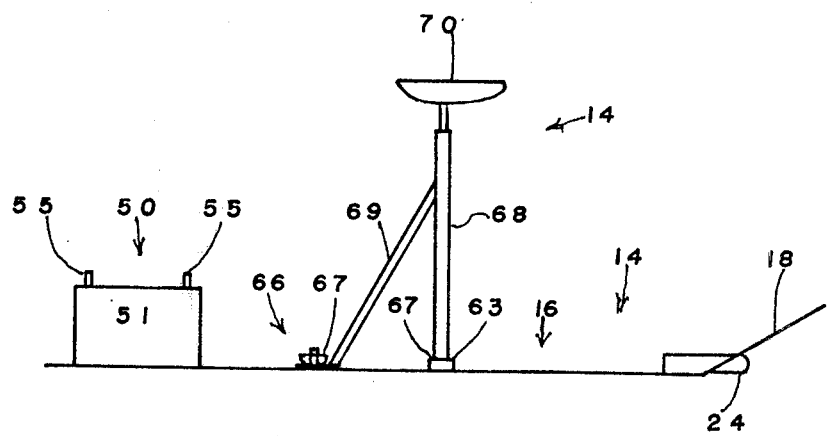
FIG. 2 is a side view of the structure shown in FIG. 1 with the DC power source mounted thereon.

The vehicle of the present invention further comprises drive means including a first drive assembly generally indicated as 44 and a second drive assembly generally indicated as 46. The first drive assembly comprises an electric motor 47 drivingly interconnected to axle element 33 by means of a driven gear 48 fixedly attached to the axle element 33 and a drive gear assembly 49 rotatably driven by the electric motor 47 and disposed in interengaging relation to the driven gear 48 as best shown in FIG. 3. The first drive assembly includes a power means in the form of an electric DC power source generally indicated as 50 (FIG. 1 and 2). The power source 50 may include a conventional electric DC battery of the type which is a multi-volt battery and designed to operate an automobile in the conventional fashion. It should therefore be readily apparent that in an emergency situation the battery 51 can be removed from the hood of the automobile and placed directly on the vehicle for activation of the first drive assembly 44. Interconnection between the electric 47 and the power source 51 is accomplished through the provision of electric conductors 52 and 53. Conductors 52 are disposed in current transmitting relation between a switch element 54 and the electric motor itself. Similarily electric conductors 53 are disposed in current directing relation between the power source 51 and the switch 54. Accordingly the control switch 54 is disposed in current regulating relation between the source 51 and the electric motor itself 47. In the conventional fashion the conductors 53 are interconnected to the terminals 55 of the power source 51.

The driving means of the present invention further comprises the second drive assembly 46 comprising a pedal 56 and sprockets 57 assembly. This pedal and sprocket assembly are drivingly interconnected to axle element 34 by means of a link chain 58 and driven gear 59 assembly. Accordingly rotation of the sprocket gear 57 through manual manipulation of the pedals 56 causes rotation on the axle element 34.

Therefore in the embodiment shown in FIGS. 3 and 4 both axle elements 33 and 34 are defined as drive axles in that the first and second drive assemblies respectively are drivingly interconnected to the axle elements 33 and 34. It should be noted that structural provision is made for both the first and second drive assemblies to be interconnected to the same axle element, either 33 or 34, thereby forming a single drive axle from the two axle elements rather than two separate drive axles as indicated in the structures of FIGS. 3 and 4. Irrespective of the embodiment utilized it is readily apparent therefore that both first and second drive assemblies can be activated independently of one another and therefore can independently or concurrently cause propulsion or motivation of the vehicle through the activation of the individual power means associated with the first and second drive assemblies respectively. As defined above the power means associated with the first drive assembly is the electric motor and a cord and accompanying DC power source and the power source accompanying the second drive assembly 46 is the manual activation of the operator in cooperation with the pedal and sprocket assembly 56 and 57.

Other structural features of the present invention comprise a stearing means generally indicated as 59 including an upstanding post element 60 removably interconnected as at 61 to the base sheet 12. Handle bar elements 62 are attached to the upwardly extending end of the shaft 60 and are disposed in reach of the operator which may be supported on the operator's support means generally indicated as 64.

The operator's support means 64 is removably mounted as at 65 and 66 through conventional connector elements 67 to the slide sheet 16 as shown in FIGS. 1 and 2. The operator's support means includes a primary support shaft 68 and a plurality of support legs 69 as indicated. A sheet element 70 is adjustably positioned on the interior, in telescoping relation, to the primary support shaft 68. Accordingly an important feature of the present invention is the removable attachment of the operator's support means 64 to the base sheet 12, the removable attachment of the slide means 14 to the base means 10 and the removable attachment of the steering means 59 to the base sheet 12.

Steering of the present invention is accomplished by a rearward and concurrent rotational force being exerted on the handle bars 62 by the operator supported on the seat 70. This rearward motion is best described as a force directed by the operator toward himself by hands grasping the handle bar element 62. If it is desired to move right or left of the current direction of travel the operator merely pivots the base sheet 12 once it is in its upwardly inclined relationship. This upwardly inclined relationship is defined by the leading edge 21 of the base sheet being raised upwardly off the surface thereby allowing both the angular inclined orientation of the base sheet and its rotational pivoting movement about the rear edge or rear end portion of the base sheet substantially adjacent to the rear axle element 34.

It will thus be seen that objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A vehicle of the type primarily designed to travel over snow and ice covered terrain, said vehicle comprising: a base comprising a sheet structure having a substantially planar configuration, running gear means movably mounted on said base and including at least two track assemblies each said track assembly mounted on opposite sides of said base along a predetermined portion of a lateral edge thereof, axle means rotatably mounted on said base and including two axle elements each defining a drive axle, each said track assembly connected in driven relation at opposite ends thereof to correspondingly positioned ends of said drive axles, drive means comprising a first and second drive assembly each drivingly connected to one of said drive axles and constructed to both operate concurrently and independently of one another, said drive means mounted on the upper surface of said base portion so that the underside of said base portion forms a sled configuration, a power means connected to said first and second drive assemblies wherein activation of said power means causes driving rotation of at least one of said drive axles, rotation of said running gear and movement of said vehicle, said first drive assembly is drivingly attached to one of said drive axles and comprises an electrically driven motor, said power means comprising an electric power source connected to said motor, a control switch interconnected, in current regulating position between said electric power source and said electric motor, said second drive assembly is drivingly attached to the other said drive axle and comprises an operator powered pedal and sprocket assembly disposed in reach of the operator, said power means comprising a manual power source defined by applying manual force to said pedal and sprocket assembly by the operator, said first and second drive assemblies are each independently interconnected in driving relation to different ones of said drive axles whereby activation of either power source respectively associated with said first and second drive assemblies causes rotation of one of said drive axles and movement of said running gear, and further comprising operator support means on said base, steering means secured to said base and disposed in reach of an operator on said operator support means, said steering disposed to have a simultaneous pulling and twisting force exerted thereon by the operator, said base being disposable in an inclined pivoted relation about the trailing edge thereof when said force is exerted on said steering means.

2. A vehicle as in claim 1 wherein each track assembly comprises a closed loop built in construction including a plurality of links disposed in spaced relation to one another and movably engaging relation to the surface over which said vehicle travels.

3. A vehicle as in claim 2 further comprising gripping elements secured in outwardly projecting relation from the surface of at least some of said plurality of links, said gripping elements disposed in surface engaging relation to the surface over which the vehicle travels.

4. A vehicle as in claim 1 wherein said drive axle most rearwardly disposed on said base defines the axis of rotation of said base when disposed in an inclined pivoted attitude.

5. A vehicle as in claim 1 wherein slide means are mounted on said base, said operator support means is removably mounted on said slide means and said slide means and steering means are removably interconnected to said base, whereby disconnection of said aforementioned elements provides for efficient storage and transportation of said vehicle.

* * * * *